US007065960B2

(12) United States Patent
Gioannini et al.

(10) Patent No.: US 7,065,960 B2
(45) Date of Patent: Jun. 27, 2006

(54) METHOD FOR ACTIVATION OF THE REGENERATION OF A PARTICULATE FILTER BASED ON AN ESTIMATE OF THE QUANTITY OF PARTICULATE ACCUMULATED IN THE PARTICULATE FILTER

(75) Inventors: Alberto Gioannini, Orbassano (IT); Michelangelo Perin, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 57 days.

(21) Appl. No.: 11/004,232

(22) Filed: Dec. 6, 2004

(65) Prior Publication Data
US 2005/0137776 A1 Jun. 23, 2005

(30) Foreign Application Priority Data
Dec. 12, 2003 (IT) .......................... TO2003A0999

(51) Int. Cl.
*F01N 3/00* (2006.01)
(52) U.S. Cl. ..................... 60/295; 60/274; 60/286; 60/297; 60/311; 701/103; 701/115; 703/5; 703/8; 73/118.1
(58) Field of Classification Search ............... 60/274, 60/276, 277, 286, 295, 297, 311; 701/103, 701/104, 115; 703/5, 8; 73/118.1
See application file for complete search history.

(56) References Cited

U.S. PATENT DOCUMENTS

| 6,405,528 | B1 * | 6/2002 | Christen et al. ............... 60/295 |
| 6,820,418 | B1 * | 11/2004 | Nakatani et al. .............. 60/297 |
| 6,862,927 | B1 * | 3/2005 | Craig et al. ................. 73/118.1 |
| 6,941,750 | B1 * | 9/2005 | Boretto et al. ................ 60/297 |
| 6,964,694 | B1 * | 11/2005 | Rauchfuss et al. ............... 95/1 |

FOREIGN PATENT DOCUMENTS

| EP | 1 081 347 A1 | 3/2001 |
| EP | 1 209 333 A1 | 5/2002 |
| EP | 1 281 843 A2 | 2/2003 |
| EP | 1 333 165 A1 | 8/2003 |

* cited by examiner

OTHER PUBLICATIONS

Ponikakis et al., Dynamic Filtration Modeling in Foam Filters for Diesel Exhaust:; 2001, Chemical Engineering Communications, London, GB, pp. 1-26, XP002196576 ISSN: 0098-6445.

*Primary Examiner*—Binh Q. Tran
(74) *Attorney, Agent, or Firm*—Berenato, White & Stavish LLC (57) ABSTRACT

Method for activation of the regeneration of a particulate filter for a motor vehicle engine, comprising the steps of calculating an estimated value ($x_M$) of a quantity of particulate accumulated in the particulate filter; comparing (8) the estimated value ($x_M$) with a threshold value ($m_{TH}$) corresponding to a predetermined maximum quantity of particulate; and activating the regeneration (9) if the estimated value ($x_M$) exceeds the threshold value ($m_{TH}$). The step of calculating an estimated value ($x_M$) comprises the steps of estimating a first quantity of particulate ($x_{MS}$) accumulated in the particulate filter by means of a statistical model (3) based on experimental data; estimating a second quantity of particulate ($x_{MF}$) accumulated in the particulate filter by means of a physical model (2) using physical quantities measured; determining a field of admissibility on the basis of the first quantity of particulate ($x_{MS}$); comparing the estimated value ($x_M$) with the second quantity of particulate ($x_{MF}$) if the second quantity of particulate ($x_{MF}$) is within the field of admissibility; and limiting the estimated value ($x_M$) if the second quantity of particulate ($x_{MF}$) is outside the field of admissibility.

12 Claims, 3 Drawing Sheets

Fig. 4 ously this ash accumulates inside the particulate filter, it gives rise to a progressive increase of the counter-pressure generated by the particulate filter, until it limits the performance of the engine; and the final disposal of the particulate filter is complex, since ash which derives from the cerium additive is toxic.

METHOD FOR ACTIVATION OF THE REGENERATION OF A PARTICULATE FILTER BASED ON AN ESTIMATE OF THE QUANTITY OF PARTICULATE ACCUMULATED IN THE PARTICULATE FILTER

BACKGROUND OF THE INVENTION

1. Field of the Invention

The present invention relates to a method for activation of the regeneration of a particulate filter based on an estimate of the quantity of particulate accumulated in the particulate filter.

2. Description of the Related Art

As is known, in order to reduce atmospheric pollution, the standards in most countries are imposing increasingly stringent limits for the composition of the exhaust gases produced by internal combustion engines.

In particular, as far as diesel engines are concerned, the main problems are caused by the presence in the exhaust gases of nitric oxides (NOx) and particulate, whereas carbon monoxides (CO) and hydrocarbons (HC) do not cause particular problems.

Many methods have been proposed hitherto in order to reduce to minimum values the quantity of particulate present in the exhaust gases emitted into the environment. However, amongst these, undoubtedly, fitting onto the gas exhaust pipe of a Diesel Particulate Filter (DPF), also known as a soot catcher or soot trap, has for many years been recognised in the field of motoring as the final response to the problem of the emissions of particulate by diesel engines.

In particular, a particulate filter in general consists of parallel channels with porous walls which are obstructed alternately. The obstructions force the exhaust gases to pass through the lateral walls of the channels, such that the non-burnt particles which constitute the particulate are firstly retained in the porosities of the lateral walls themselves, and then, when the latter are completely filled, they accumulate on the inner surfaces of the walls of the channels, thus forming a layer of accumulation.

As the accumulation of particulate on the inner surfaces of the walls of the channels increases, there is also an increase in the pressure drop on the particulate filter and therefore in the counter-pressure generated by the particulate filter itself.

The particulate thus cannot be accumulated indefinitely, since high levels of accumulation give rise to:

deterioration of the performance, drivability and consumption of the engine, until at the limit the engine itself stalls; and destruction of the particulate filter in the event of self-priming and uncontrolled combustion of the particulate; in fact, in the presence of large accumulations of particulate, in particular driving conditions there can be triggering of "critical" regeneration phenomena, consisting of sudden and uncontrolled combustion of the particulate: consequently, the high temperatures which are generated inside the ceramic matrix of the particulate filter can give rise to damage to the latter.

It is therefore necessary to remove periodically the particulate which has accumulated, by carrying out so-called "regeneration" of the particulate filter. In particular, in the field of motoring, "regeneration" of the particulate filter means combustion of the particulate which has accumulated (consisting prevalently of carbon, C), which, in contact with the oxygen which is present in the exhaust gases is transformed into carbon monoxide, CO and carbon dioxide, $CO_2$.

However, this reaction takes place naturally (i.e. without the use of additives) only at temperatures higher than about 600° C., and these thermal levels are much higher than those which are measured at the intake of the particulate filter in conditions of normal functioning of the engine.

In certain conditions, i.e. when specific levels of accumulation of particulate are detected in the particulate filter, it is therefore necessary to raise the temperature of the exhaust gases artificially at the intake of the particulate filter itself, until self-priming of the combustion of the particulate is obtained.

The regeneration of a particulate filter constitutes the main problem associated with the use of this type of filter in the automobile field.

Many methods have been proposed and/or used hitherto in order to increase artificially the temperature of the exhaust gases at the intake of the particulate filter, and to obtain triggering of the combustion of the particulate.

In particular, the methods for self-priming of the combustion of the particulate can be sub-divided roughly into two main categories, depending on the type of approach used: the first category includes methods for self-priming based on the use of an additive to the diesel fuel, which, by acting as a catalyst, makes it possible to reduce the temperature of triggering of the regeneration by about 100–150° C., whereas the second category includes the methods for self-priming of the combustion of the particulate which are based on control of the combustion of the engine.

In particular, the methods for self-priming of the combustion of the particulate based on the use of an additive require:

an exhaust system comprising a catalyser and a particulate filter integrated in a single casing (canister);

a particulate filter with a very high volume, typically equivalent to approximately twice the engine displacement;

an additive in the diesel fuel (based on cerium), which makes it possible to reduce the regeneration self-priming temperature by 100–150° C.;

a very complex system for adding and automatic metering of the additive on board the vehicle; and engine control strategies in order to increase the temperature at the particulate filter intake, since the thermal levels necessary cannot be reached in normal conditions of use of the engine; in fact, this type of system operates correctly only when the engine is running with medium loads, whereas in the event of prolonged functioning with low loads (for example when driving in towns) and/or in the presence of low external temperatures (in winter), in many cases the temperature of the exhaust gases cannot reach that of self-priming.

Although the methods for self-priming of the combustion of the particulate which are based on the use of an additive permit self-priming of the regeneration of the particulate filter at about 450–500° C., and the particulate filter generates low counter-pressure, they have the following significant disadvantages, which do not allow their benefits to be used adequately and fully:

complexity, in particular for the system for adding and automatic metering of the additive;

need for installation of a particulate filter with a high volume, since the additive which is present in the diesel fuel leaves a deposit of ash inside the particulate filter itself which increases progressively;

need to "re-clean" ash from the particulate filter approximately every 80,000 km, despite the large volume of the particulate filter itself; in fact the cerium produces a large quantity of ash which accumulates inside the filter, together with the particulate, and cannot be eliminated by means of the regeneration; this therefore gives rise to a progressive increase in the counter-pressure of the filter on the engine, as the distance travelled by the vehicle increases, and to the consequent need to carry out periodically dismantling and cleaning of the filter in order to eliminate the ash which has accumulated; and high costs, both for the system for adding and automatic metering of the additive and for the particulate filter with a large volume.

Because of the many above-described disadvantages, almost all car manufacturers now prefer the methods for self-priming of the combustion of the particulate which are not based on the use of an additive, to those which are based on the use of an additive.

One of the solutions proposed and used in the past in order to increase artificially the temperature of the exhaust gases in the particulate filter, without resorting to the use of an additive, consisted of providing the particulate filters themselves with heater elements which were activated periodically in order to bring the particulate filter up to the temperature of self-priming of the combustion of the trapped particulate.

More recently, on the other hand, solutions have been proposed wherein the increase in temperature of the exhaust gases at the intake of the particulate filter is obtained by means of strategies for control of the combustion of the engine.

In particular, the strategies which are used commonly in order to increase the temperature at the intake of the particulate filter are:

acting on the main injection in order to obtain delayed combustion;

actuating post-injection after the main injection; or acting on the air admitted in order to reduce it (for example by reducing the supercharging or by choking the intake).

In detail, the strategy which is based on the delay of the main injection has limits caused by the fact that the main injection cannot be delayed beyond a certain limit, otherwise it would give rise to unstable combustion which would cause misfiring, with consequent production of white/blue fumes and problems of drivability, and in particular to phenomena of "failure". For these reasons, this strategy does not make it possible to obtain high temperatures at the intake of the particulate filter, in particular at low engine speeds and with low loads.

On the other hand, in international patent application PCT/IT95/00124 which was filed on Jul. 21, 1995 by the applicant and published on Feb. 8, 1996 under number WO-A-96 03571, a strategy was proposed in which the increase in the temperature of the exhaust gases at the intake of the particulate filter is obtained by carrying out post-injection during the expansion stage, in addition to the main injection.

In particular, the timing of the post-injection in relation to the main injection and the quantity of fuel injected, are determined so that the combustion of the fuel in the expansion stage is such as to give rise to an increase in the temperature of the exhaust gases which is sufficient to cause self-priming of the regeneration of the particulate filter.

In international patent application PCT/IT95/00123 which was filed on Jul. 21, 1995 by the Applicant and published on Feb. 8, 1996 under number WO-A-96 03572, a strategy was also proposed in which the increase in the temperature of the exhaust gases at the intake of the particulate filter is obtained by carrying out post-injection during the exhaust stage, in addition to the main injection.

In particular, since in general the particulate filter is integrated in a single casing (canister), together with a DeNOx catalyser disposed upstream from the particulate filter itself, post-injection which is carried out prevalently in the engine exhaust stage, ensures that the fuel injected does not contribute, or contributes only slightly, to the combustion, and therefore reaches the catalyser directly and without being burned.

The non-burned hydrocarbons which are thus introduced into the catalyser trigger an exothermal reaction of oxidation which gives rise to an increase in the temperature of the exhaust gases at the output of the catalyser, and consequently to an increase in the temperature of the exhaust gases at the intake of the particulate filter.

In comparison with the methods for self-priming of the combustion of the particulate which are based on the use of an additive, the methods for self-priming of the combustion of the particulate which are based on control of the combustion of the fuel require:

a particulate filter with a volume which is substantially equivalent to the displacement of the engine, i.e. half that required by the methods for self-priming of the combustion of the particulate based on the use of an additive;

an exhaust system which can alternatively:

have a configuration similar to that required by the methods for self-priming of the combustion of the particulate based on the use of an additive, i.e. comprising a catalyser and a particulate filter which are integrated in a single casing (canister); or comprise a single filter which has deposited on it both the oxidising elements of the catalyser, and metal elements (Ce+Pt), which reduce the temperature of self-priming (Catalysed Soot Filter);

no additive in the diesel fuel;

no system for adding and automatic metering of the additive on board the vehicle; and engine control strategies in order to increase the temperature at the intake of the particulate filter.

In particular, the difference between the use of an exhaust system comprising a catalyser and a particulate filter integrated in a single casing (canister) and the use of an exhaust system comprising a single filter which has deposited on it both the oxidising elements of the catalyser and metals which reduce the temperature of self-priming, consists in the fact that in the first type of exhaust system the self-priming of the regeneration takes place at around 600° C., and the particulate filter has low counter-pressure, whereas in the second type of exhaust system, the self-priming of the regeneration takes place at around 450° C., but the particulate filter has high counter-pressure, and the risks exist both of reduced efficiency of regeneration, caused by the contact between the cesium and the particulate, and of drift of the efficiency of regeneration, i.e. of an increase in the temperature of triggering of the regeneration.

The advent of second-generation common rail injection systems has made it possible to obtain considerable progress in the field of regeneration of the particulate filter.

For a more detailed discussion of the subject of common rail injection systems, see for example European patent application 00104651.5 filed on Mar. 3, 2000 by the Applicant and published on Sep. 13, 2000 under number EP-A-1 035 314, the content of which is considered to be incorporated in its entirety here.

Figure 1:
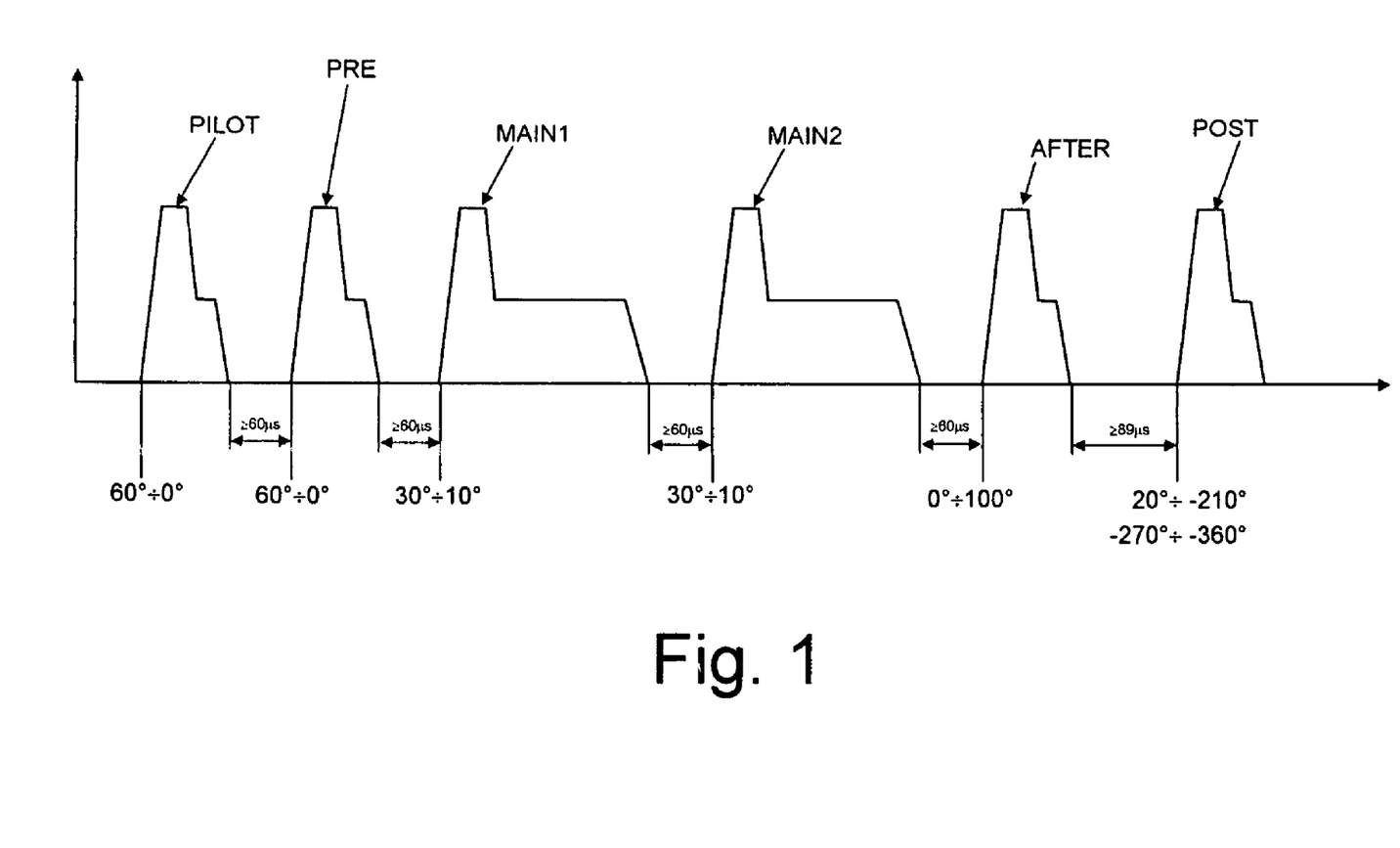
FIG. 1 shows a temporal diagram relating to the multiple injections which can be actuated by means of a common rail injection system.

As is known, in each engine cycle and in each cylinder of the engine, the injection system of the common rail type makes it possible to carry out one or more of the following injections, as shown in FIG. 1, which also details the timing and the engine angles at which the injections themselves are carried out:

- a main injection MAIN, which is actuated around the top dead centre of combustion;
- a pre-injection PRE, which precedes the main injection MAIN, and is carried out sufficiently close to the main injection MAIN to obtain continuity of combustion with the main injection MAIN itself;
- a post-injection AFTER, which follows the main injection MAIN, and is also carried out sufficiently close to the main injection MAIN to obtain continuity of combustion with the main injection MAIN itself;
- a pre-injection PILOT, which precedes the pre-injection PRE, is actuated during the compression stage, and is much earlier than the top dead centre of combustion, such that that it does not participate in the combustion of the fuel injected in the pre-injection PRE; and
- a post-injection POST, which follows the post-injection AFTER, and is much later than the top dead centre of combustion, such that that it does not participate in the combustion of the fuel injected in the post-injection AFTER.

Each of the aforementioned injections corresponds to a specific effect on the functioning of the engine, which makes it possible to achieve a specific aim.

In particular:

- the PILOT injection gives rise to an increase in the pressure inside the cylinder at the end of the compression stage, and this increase consequently gives rise to a reduction in the starting times of the engine, to a reduction of the noise and fume emission of the engine during the transitory warm-up stage of the engine, and to an increase in the torque distributed by the engine at low speeds;
- the PRE injection gives rise to a reduction of the ignition delay, i.e. in the time which elapses between the injection of the fuel inside the cylinder in the main injection MAIN, and the true start of the combustion in the cylinder itself, and this reduction of the ignition delay consequently gives rise to a reduction of the combustion noise generated by the engine;
- the AFTER injection gives rise to post-oxidation of the exhaust gases inside the cylinder, and this post-oxidation consequently gives rise to a reduction of the quantity of particulate generated during the combustion; and
- the POST injection gives rise to the injection of a quantity of fuel during the exhaust stage, which, since the true combustion has already ended, is not burned, and reaches the exhaust unaltered, thus giving rise to an increase in the hydrocarbons HC present at the exhaust, which in turn activate the DeNOx catalyser, consequently giving rise to an increase in its efficiency. The exothermal reaction of oxidation which occurs inside the DeNOx catalyser also leads to an increase in the temperature of the exhaust gases at the intake of the particulate filter, which, as is known, is downstream from the DeNOx catalyser, thus permitting the regeneration of the particulate filter itself.

It is also possible to subdivide the MAIN injection into two separate injections, MAIN1 and MAIN2, such as to give rise to a reduction of the temperature peaks generated by the combustion, and consequently to a reduction of the quantity of nitric oxides NOx generated during the combustion itself.

For a more detailed description of the subject of multiple injections, see for example the aforementioned European patent application 00104651.5 filed on Mar. 3, 2000 by the Applicant and published on Sep. 13, 2000 under number EP-A-1 035 314.

Because of the extreme flexibility of the second-generation common rail injection systems, in European patent application 02017387.8 filed on Aug. 2, 2002 by the Applicant and published on Feb. 5, 2003 under number EP-A-1 281 852, the content of which is considered to be incorporated here in its entirety, it has been proposed to obtain the raising of the temperature of the exhaust gases necessary for regeneration of the particulate filter simply by acting on the timing of one or more of the injections, in relation to the timings assumed when the regeneration of the particulate filter is not carried out.

In particular, an in-depth study carried out by the Applicant has led to determination, for each point of functioning of the engine, of particular combinations and timings of the above-described multiple injections, which permit self-priming of the regeneration of the particulate filter.

In addition to this, the study carried out by the Applicant has led to verification of how the effect of these particular timings and combinations of the multiple injections on the regeneration of the particulate filter can be further improved by acting on other values of the engine and/or of the injection system, such as the flow rate of the air admitted, the injection pressure and the quantity of recirculated exhaust gases.

In particular, in broad outline, the strategies for regeneration of the particulate filter determined by the Applicant involve the following actions in order to raise the temperature of the exhaust gases at the intake of the particulate filter itself:

- carrying out three or four of the injections PILOT, PRE, MAIN and AFTER, correspondingly delayed in comparison with the timing of the injections themselves in conditions of non-regeneration of the particulate filter, which injections participate in the combustion process and make it possible to obtain stable delayed combustion, thus raising the temperatures of the exhaust gases; and
- carrying out the post-injection POST in order to supply hydrocarbons HC to the oxidising DeNOx catalyser which is placed upstream from the particulate filter, and using the resulting exothermal oxidation reaction in order thus to increase further the temperature of the exhaust gases at the output from the oxidising catalyser itself, and therefore at the intake of the particulate filter.

In order to be able to activate the above-described strategies of regeneration of the particulate filter when actually necessary, it is of fundamental importance to be able to estimate as reliably as possible the mass of particulate which is present at any moment inside the particulate filter itself.

In this respect, it has been verified experimentally that the accumulation of particulate in the particulate filter does not depend exclusively on the mileage travelled by the vehicle, but that other factors also, such as the type of route travelled and the conditions of use of the vehicle itself have a rather pronounced influence on the accumulation of particulate. In addition, account must also be taken of any abnormalities of functioning of the engine, which can involve a significant increase in the emissions of particulate and the accumulation of quantities of particulate such as to detract seriously from the reliability of the particulate filter.

In order to estimate accurately the quantity of particulate accumulated, such as to trigger the regeneration of the particulate filter only when this quantity exceeds predetermined critical levels, the Applicant has developed substantially two estimation models, i.e. a "statistical" model and a "physical" model.

In detail, the "statistical" model is based on collection carried out on the field, and with experimental data tests relating to the performance of a plurality of particulate filters in a broad field of conditions of functioning of the engine, for example when idling, in conditions of urban, extra-urban and motorway driving, and in conditions of high torque and high power. The data gathered makes it possible to create statistics for the accumulation of particulate inside the particulate filter when the time and point of functioning of the engine vary.

In fact, the accumulation of particulate inside the particulate filter is a strongly non-linear process which is dependent on time, but is also strongly affected by the point of work of the engine.

This gathering of data on the field makes it possible to correlate each individual engine functioning point with a value which corresponds to the mass of particulate accumulated in the particulate filter in the unit of time ("PM—Particulate Matter", expressed in g/h).

The mass of particulate which is present in the particulate filter at a predetermined moment is thus obtained as the sum of the mass of particulate accumulated over a period of time, in order to obtain as the final result the estimate of the mass of particulate accumulated, expressed as a percentage of the optimum quantity of particulate at which the regeneration process should be initiated.

A detailed description of the "physical" model can be found in European patent application 03001562.2 filed on Jan. 23, 2003 by the Applicant and published on Aug. 6, 2003 under number EP-A-1 333 165, the content of which is considered to be incorporated in its entirety here.

This model, which is based on a series of intake parameters obtained from sensors inside the engine unit (such as temperature of the exhaust gases, difference in intake-output pressure of the particulate filter, etc.), provides a precise value of the mass of particulate accumulated at a given moment.

The physical model can be reduced to the following equation, which puts into relation the mass of particulate accumulated inside the particulate filter and the aforementioned intake parameters:

$$\Delta P_{DPF} \cdot \left( \frac{\Delta P_{DPF}}{2} + P_{atm} \right) = T^{\delta+1} \cdot Q_m \cdot (\alpha + \beta \cdot m_S) + \gamma \cdot T \cdot Q_m^2$$

wherein:
$\Delta P_{DPF}$[mbar] is the pressure drop on the particulate filter, measured by corresponding pressure sensors situated upstream and downstream from the filter itself;
$P_{atm}$[mbar] is the absolute pressure downstream from the particulate filter (which can optionally be approximated with atmospheric pressure);
T is the temperature of the exhaust gases;
$Q_m$[m³/h] is the volumetric flow rate of the exhaust gas (calculated by adding the flow rate of air admitted into the engine and the total quantity of fuel injected);
$m_s$[g] is the mass of particulate which has accumulated in the particulate filter, and which must be determined; and $\alpha, \beta, \gamma, \delta$ are experimental calibration coefficients which depend on the characteristics of the particulate filter (geometric dimensions, physical-chemical properties of the material used, etc.), and can be determined experimentally by carrying out a specific series of bench tests with the engine at stationary speed.

The mass of particulate which is present inside the particulate filter can thus be determined from the preceding formula, and is expressed by the formula:

$$m_S = \frac{\Delta P_{DPF} \cdot \left( \frac{\Delta P_{DPF}}{2} + P_{atm} \right) - \gamma \cdot T \cdot Q_m^2}{T^{\delta+1} \cdot Q_m \cdot \beta} - \frac{\alpha}{\beta}$$

On the basis of the studies carried out by the Applicant, it has been found that both the models described, i.e. the statistical model and the physical model, are necessary in order to obtain a reliable estimate of the quantity of particulate accumulated inside the particulate filter.

In fact, the statistical model makes it possible to obtain a mean estimate of the particulate emitted by an engine, assuming that all its components are ideal, there is zero dispersion of production and there is no malfunctioning during the life cycle. On the other hand, the purpose of the physical model is to take into account all the differences which may exist between an ideal engine, such as that assumed by the statistical model, and a real engine, caused for example by any malfunctioning which could lead either to an excess production of particulate (for example because the exhaust gas recirculation valve is locked open), or to reduction of it (for example because the exhaust gas recirculation valve is locked closed).

At present, the methods for activation of the regeneration of the particulate filter involve estimating the quantity of particulate which is present inside the particulate filter, and activating the regeneration of the filter as soon as the estimated mass exceeds a certain critical threshold of regeneration, equivalent to the maximum quantity of particulate which can be accumulated in the filter before malfunctioning is caused.

Figure 2:
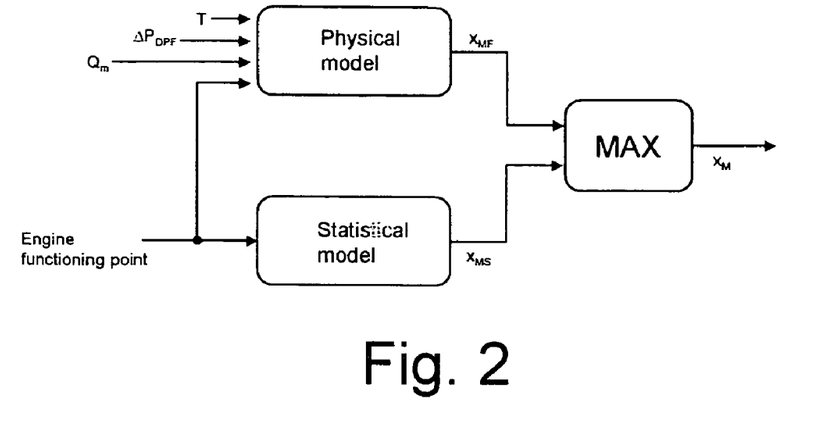
FIG. 2 shows a block diagram relating to a method for estimation which is based on the maximum from amongst the estimates provided by the physical and statistical models.

In order to estimate the quantity of particulate accumulated, the idea was conceived of utilising the information obtained from both models, considering as a reliable estimate the maximum level from amongst the quantity of particulate estimated by means of the physical model, and the quantity of particulate estimated by means of the statistical model, as represented schematically in FIG. 2.

This type of ratio applied to the estimates provided by the two models makes it possible to obtain a conservative estimate of the quantity of particulate accumulated, and allocates to both models the same priority of intervention in relation to activation of the stage of regeneration of the particulate filter. In fact, since there is a certain mass of particulate which is considered sufficient to activate the regeneration of the particulate filter, the first model to estimate this level is authorised to activate the regeneration of the filter.

However, this solution is not satisfactory. In fact, the estimate which is carried out by the physical model is based mainly on the information supplied by the external sensors, in particular the sensors for the air flow rate, the temperature of the exhaust gases and the pressure drop on the particulate filter. In addition, in certain situations, these sensors may be affected by errors which cannot be detected by suitable control systems, and are caused by electrical malfunctioning (slow drifts, variations of offset and gain) or mechanical malfunctioning (dirt, obstructions, etc.); in this case, the estimate of the accumulated particulate is not correct, and if it is overestimated, it may give rise to activation of the regeneration stage before this is actually necessary. In fact, in the event of overestimation, the physical model undoubtedly takes precedence over the statistical model, on the basis of the general ratio applied to the outputs of the two models, and the quantity of overestimated particulate exceeds the critical threshold of regeneration.

In addition, as indicated, the regeneration strategy involves the use of the POST injection, which, however, involves a delicate problem associated with the dilution of the lubricating oil. In fact, at the engine angles which are used for this injection, inside the cylinder there is low resistance to the jet of fuel, which consequently comes into contact with the film of oil present on the walls of the cylinder, thus causing dilution of the film.

The increase in the frequency of regeneration caused by the overestimate made by the physical model can thus lead to excessive dilution of the engine oil, with consequent deterioration of the quality of the lubricant.

The liquid lubricant may thus no longer be able to carry out its main functions (reduction of friction, protection against wear of the mechanical units, discharge of heat, etc.), with consequent possible damage to the engine.

SUMMARY OF THE INVENTION

The object of the invention is to provide a method for activation of the regeneration of a particulate filter on the basis of an estimate of the quantity of particulate accumulated in the particulate filter itself, which method solves the above-described problem.

The object in question is achieved by the present invention, in that it relates to a method for activation of the regeneration of a particulate filter of a motor vehicle engine, comprising the steps of calculating an estimated value of a quantity of particulate accumulated in the said particulate filter; comparing the said estimated value with a threshold value corresponding to a predetermined maximum quantity of particulate; and activating the said regeneration if the said estimated value exceeds the said threshold value; characterised in that the said step of calculating an estimated value comprises the steps of estimating a first quantity of particulate accumulated in the said particulate filter by means of a statistical model based on experimental data; estimating a second quantity of particulate accumulated in the said particulate filter by means of a physical model using physical quantities measured; determining a field of admissibility on the basis of the said first quantity of particulate; comparing the said estimated value with the said second quantity of particulate, if the said second quantity of particulate is within the said field of admissibility; and limiting the said estimated value if the said second quantity of particulate is outside the said field of admissibility.

BRIEF DESCRIPTION OF THE DRAWINGS

In order to assist understanding of the present invention, a preferred embodiment of it is now described purely by way of non-limiting example, and with reference to the attached drawings, in which.

DETAILED DESCRIPTION OF THE PREFERRED EMBODIMENTS

The inventive concept on which the present invention is based consists of activating the regeneration of the particulate filter on the basis of an estimate of the quantity of particulate accumulated, wherein the authorisation for intervention of a physical model is limited by checking that the output of this model is plausible, and is therefore not distorted for example by faults on the sensors which supply the input parameters of the model itself.

In particular, on the basis of the output of a statistical model, there is creation of a band within which the physical model is allowed to intervene. In other words, at any moment, the estimate of the physical model, determined on the basis of values measured by input sensors, is compared with a plausible minimum value and maximum value created correspondingly on the basis of the value output by the statistical model, and if these values are exceeded, setting of this minimum or maximum plausible value is applied.

Figure 3:
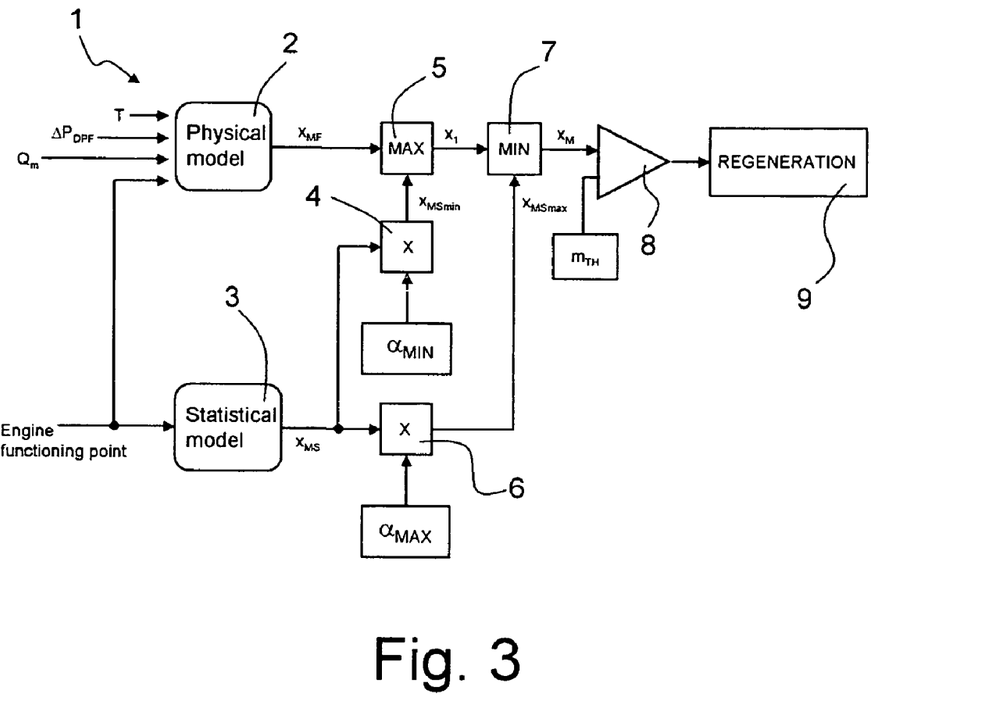
FIG. 3 shows a block diagram relating to a preferred embodiment of the method according to the present invention.

FIG. 3 shows a block diagram relating to an activation system 1 for activation of the regeneration of the particulate filter on the basis of the estimate of the mass of particulate accumulated inside the particulate filter itself, carried out according to a preferred embodiment of the present invention.

In detail, the activation system 1 comprises a first calculation block 2 which uses a physical model, which for example is the same as that described with reference to the state of the art, in order to obtain an estimated physical value $x_{MF}$ of the mass of particulate accumulated, based on input parameters which are associated with values measured of the engine unit (including for example the engine functioning point, the temperature T of the exhaust gases, the pressure drop $\Delta_{PDF}$ at the particulate filter, and the volumetric flow rate $Q_m$ of the exhaust gases). In particular, the estimated physical value $x_{MF}$ represents the precise value of the mass of particulate present inside the particulate filter at a predetermined moment.

On the other hand, it second calculation block 3 uses a statistical model in order to obtain an estimated statistical value $x_{MS}$ of the mass of particulate accumulated, calculated on the basis of statistical measurements relating to data gathered on the field in various conditions of use, and for each engine functioning point. In particular, the estimated statistical value $x_{MS}$ of the mass of particulate present inside the particulate filter at a predetermined moment is obtained as the sum of the mass of particulate accumulated over a period of time.

The estimated statistical value $x_{MS}$ is then multiplied in a first and second multiplication block 4 and 6 respectively for a minimum coefficient $\alpha_{min}$ and a maximum coefficient $\alpha_{max}$ (where $\alpha_{max} \geq \alpha_{min}$). At the output of the first and second multiplication blocks 4, 6, there are therefore present respectively a lower limitation value $x_{MSmin}$ and an upper limitation value $x_{MSmax}$ for the statistical model.

In particular, the values of the minimum and maximum coefficients $\alpha_{min}$ and $\alpha_{max}$ are calibrated appropriately on the basis of the weighting to be allocated to the physical model and to the statistical model, and thus to the field of variability which is admissible for the estimated physical value $x_{MF}$. Typically, the values of the minimum and maximum coefficients $\alpha_{min}$ and $\alpha_{max}$ are selected such that the lower $x_{MSmin}$ and upper $x_{MSmax}$ limitation values represent a predetermined percentile variation (for example ±10%) in comparison with the estimated statistical value $x_{MS}$. In practice, the lower limitation value $x_{MSmin}$ and the upper limitation value $x_{MSmax}$ correspond respectively to a best case, in which a minimum quantity of particulate is generated, and a worst case, in which a maximum quantity of particulate is generated, i.e. to the best and worst performance levels of the particulate filters examined in the various conditions of use which have led to production of the statistics.

The estimated physical value $x_{MF}$ is firstly compared with the lower limitation value $x_{MSmin}$ of the statistical model in a maximum block 5, which supplies as output a limited value $x_1$ which corresponds to the maximum between $x_{MSmin}$ and $x_{MF}$. The limited value $x_1$ is then compared with the upper limitation value $x_{MSmax}$ in a minimum block 7, which supplies as output an estimated operative value $x_M$. The estimated operative value $x_M$ represents a reliable estimate of the mass of particulate accumulated inside the particulate filter.

In particular, it can be noted that the authorisation of the physical model is limited, bringing it into relationship with that of the statistical model, and in practice thus creating a band which can be calibrated, within which the estimated physical value $x_{MF}$ is considered to be reliable.

The estimated operative value $x_M$ of the mass of particulate is then compared in a comparator block 8 with a threshold of regeneration $m_{TH}$ of the particulate filter, corresponding to the optimum mass of particulate at which the process of regeneration of the particulate filter should be initiated, such as to activate the regeneration, in an activation block 9, in the case in which the estimated operative value $x_M$ is greater than the threshold of regeneration $m_{TH}$.

Figure 4:
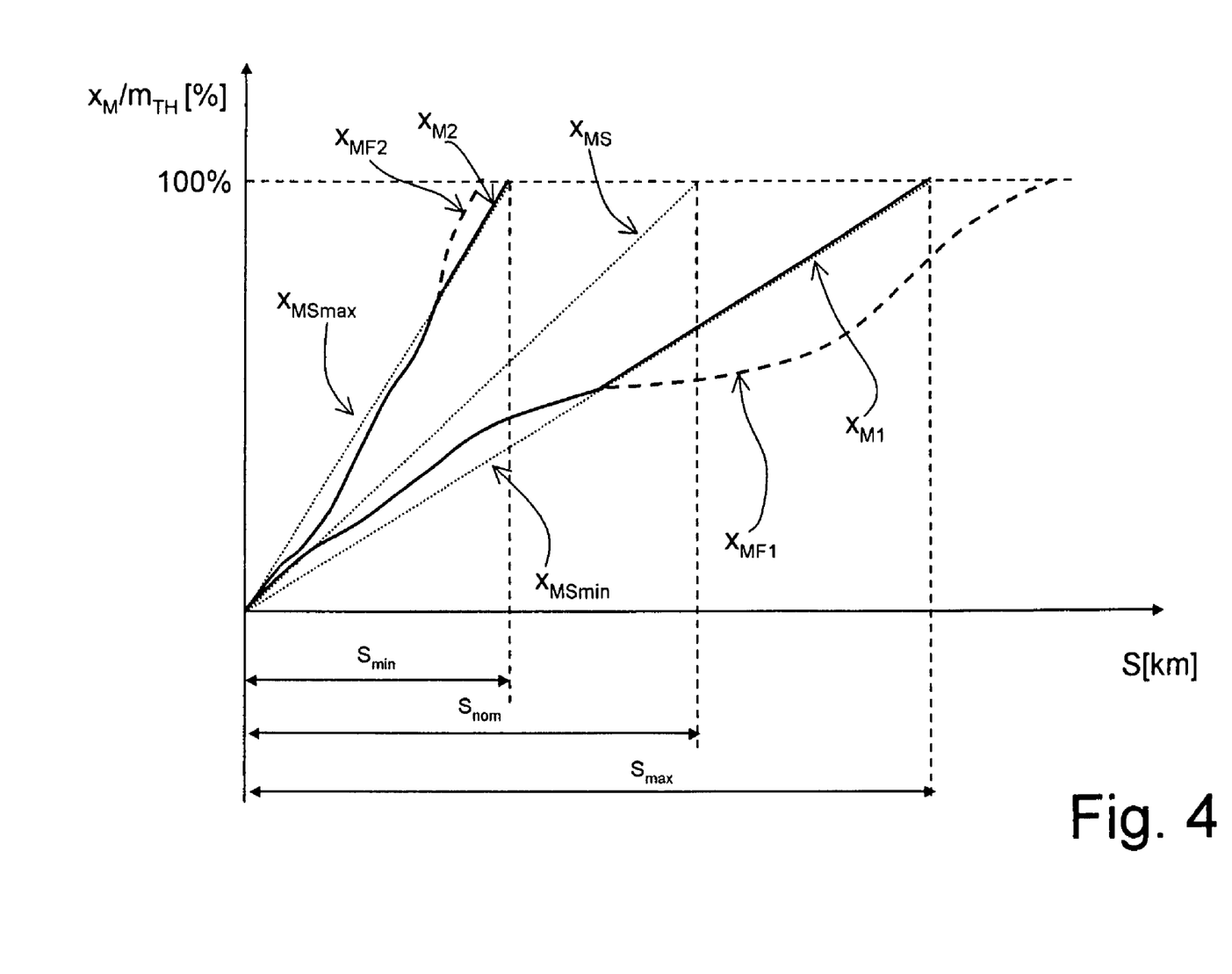
FIG. 4 shows the development of some values relating to the diagram in FIG. 3.

FIG. 4 shows a graph relating to the functioning of the above-described activation system 1, wherein the y axis contains the percentile ratio [%] between the estimated operative value $x_M$ of the mass of particulate which has accumulated in the particulate filter, and the optimum mass of particulate at which the process of regeneration of the filter itself should be initiated, corresponding to the threshold of regeneration of the filter $m_{TH}$. This threshold of regeneration is known from the type and volume of the particulate filter used, according to the formula:

$$m_{TH} = P_{TH} \cdot V$$

where $P_{TH}$ is the optimum quantity of particulate at which the regeneration should be initiated for the particulate filter used, expressed in grams/litre, and V is the volume of the particulate filter itself expressed in litres. On the other hand, on the x axis of the graph in FIG. 4, S indicates the distance in kilometres travelled by the vehicle. The curves on this graph thus show the development relating to the quantity of particulate accumulated in the particulate filter as the distance travelled varies.

In detail, the broken lines relate to the estimated statistical value $x_{MS}$ and to the lower $x_{MSmin}$ and upper $x_{MSmax}$ limitation values, which determine the band inside which the estimated physical value $x_{MF}$ is considered reliable. The estimated statistical value $x_{MS}$ corresponds to a mileage distance $S_{ncm}$ before the regeneration of the particulate filter, whereas the lower $x_{MSmin}$ and upper $x_{MSmax}$ limitation values correspond respectively to a best case with maximum mileage distance $S_{max}$ and a worst case with minimum mileage distance $S_{min}$, before the particulate filter is regenerated.

FIG. 4 also shows the development of two estimated physical values $x_{MF1}$ and $x_{MF2}$ in two different situations, and specifically the development of the estimated physical value $x_{MF1}$ relates to the case in which at least part of the physical model provides a lower estimate of the lower limitation value $x_{MSmin}$, and the development of the estimated physical value $x_{MF2}$ relates to the case in which at least part of the physical model provides an upper estimate of the upper limitation value $x_{MSmax}$.

Consequently, according to the present invention, the estimated physical values $x_{MF1}$ and $x_{MF2}$ are considered to be reliable only within the band contained between the lower $x_{MSmin}$ and upper $x_{MSmax}$ limitation values, and are limited outside this band, as shown in each case by a continuous line which represents the estimated operative values $x_{M1}$ and $x_{M2}$.

The advantages which can be obtained by means of the method for activation of the regeneration of a particulate filter produced according to the present invention, are clear from examination of its characteristics.

In particular, it is apparent that the method permits activation of regeneration of the particulate filter only when actually necessary, thus preventing both overestimation of the mass of the particulate and the consequent excessive regeneration of the particulate filter, with the problem of dilution of the lubricant fluid, and underestimation of the mass of the particulate which in turn could lead to excessive mileage distances before the particulate filter itself is regenerated, and thus to possible engine faults.

In addition, by means of appropriate calibration of the minimum and maximum coefficients applied to the estimated statistical value, it is possible to adapt the system to the required conditions, thus improving its reliability and precision of estimation.

In addition, by processing appropriately the information associated with the estimated operative value, obtained by limiting the physical model, it is possible to obtain valid diagnostic information on the state of the engine unit and the sensors used.

By using this information it is possible for example to set to a value of one, the two minimum and maximum coefficients, such as to disable the physical model and to use exclusively the statistical model, in the case when the existence of faults is detected on the sensors used in order to obtain the input parameters of the physical model itself.

Finally, the system for activation of the regeneration can be implemented in a particularly simple manner, for example by means of a programme.

It is apparent that modifications and variations can be made to the method for regeneration of the particulate filter described and illustrated here, without departing from the protective scope of the present invention, as defined in the attached claims.

The invention claimed is:

1. Method for activation of the regeneration of a particulate filter for a motor vehicle engine, comprising the steps of:
   calculating an estimated value ($x_M$) of a quantity of particulate accumulated in the said particulate filter;
   comparing the said estimated value ($x_M$) with a threshold value ($m_{TH}$) corresponding to a predetermined maximum quantity of particulate; and activating the said regeneration if the said estimated value ($x_M$) exceeds the said threshold value ($m_{TH}$); characterised in that the said step of calculating an estimated value ($x_M$) comprises the steps of:

estimating a first quantity of particulate ($x_{MS}$) accumulated in the said particulate filter by means of a statistical model based on experimental data;

estimating a second quantity of particulate ($x_{MF}$) accumulated in the said particulate filter by means of a physical model using physical quantities measured;

determining a field of admissibility on the basis of the said first quantity of particulate ($x_{MS}$);

comparing the said estimated value ($x_M$) with the said second quantity of particulate ($x_{MF}$) if the said second quantity of particulate ($x_{MF}$) is within the said field of admissibility; and limiting the said estimated value ($x_M$) if the said second quantity of particulate ($x_{MF}$) is outside the said field of admissibility.

2. Method according to claim 1, wherein the said step of determining a field of admissibility comprises the step of determining an upper limit value ($x_{MSmax}$) on the basis of the said first quantity of particulate ($x_{MS}$) and the said step of limitation consists of comparing the said estimated value ($x_M$) with the said upper limit value ($x_{MSmax}$) when the said second quantity of particulate ($x_{MF}$) is greater than the said upper limit value ($x_{MSmax}$).

3. Method according to claim 2, wherein the said step of determining a field of admissibility also comprises the step of determining a lower limit value ($x_{MSmin}$) on the basis of the said first quantity of particulate ($x_{MS}$); and the said step of limitation consists of comparing the said estimated value ($x_M$) with the said lower limit value ($x_{MSmin}$) when the said second quantity of particulate ($x_{MF}$) is lesser than the said lower limit value ($x_{MSmin}$).

4. Method according to claim 3, wherein the said step of determining a field of admissibility comprises the steps of:

multiplying the said first quantity of particulate ($x_{MS}$) by a first coefficient ($\alpha_{min}$) in order to obtain the said lower limit value ($x_{MSmin}$); and multiplying the said first quantity of particulate ($x_{MS}$) by a second coefficient ($\alpha_{max}$), which is greater than the said first coefficient ($\alpha_{min}$), in order to obtain the said upper limit value ($x_{MSmax}$).

5. Method according to claim 4, wherein the said first and second coefficients ($\alpha_{min}$, $\alpha_{max}$) can be calibrated.

6. Method according to claim 4, wherein the said first and second coefficients ($\alpha_{min}$, $\alpha_{max}$) are equal to one.

7. Method according to claim 1, wherein the said physical values measured are detected on the said engine.

8. Method according to claim 1, wherein the said second quantity of particulate ($x_{MF}$) is estimated on the basis of the following mathematical formula:

$$x_{MF} = \frac{\Delta P_{DPF} \cdot \left(\frac{\Delta P_{DPF}}{2} + P_{atm}\right) - \gamma \cdot T \cdot Q_m^2}{T^{\delta+1} \cdot Q_m \cdot \beta} - \frac{\alpha}{\beta}$$

wherein:

$\Delta P_{DPF}$ is the pressure drop across the said particulate filter;

$P_{atm}$ is the absolute pressure downstream from the said particulate filter;

T is the temperature of the exhaust gases of the said engine;

$Q_m$ is the volumetric flow rate of the exhaust gases; and $\alpha,\beta,\gamma,\delta$ are predetermined parameters.

9. Method according to claim 8, wherein $\alpha,\beta,\gamma,\delta$ are experimental calibration coefficients which are dependent on physical and/or physical-chemical characteristics of the said particulate filter.

10. System for activation (1) of the regeneration of a particulate filter for a motor vehicle engine, comprising:

calculation means (2–7) which can calculate an estimated value ($x_M$) of a quantity of particulate accumulated in the said particulate filter;

comparator means (8) which can compare the said estimated value ($x_M$) with a threshold value ($m_{TH}$) corresponding to a predetermined maximum quantity of particulate;

regeneration activator means (9) which are enabled by the said comparator means (8) if the said threshold value ($m_{TH}$) is exceeded by the said estimated value ($x_M$);

characterised in that the said calculation means (2–7) comprise:

first estimator means (3) which can estimate a first quantity of particulate ($x_{MS}$) accumulated in the said particulate filter by means of a statistical model based on experimental data;

second estimator means (2) which can estimate a second quantity of particulate ($x_{MF}$) accumulated in the said particulate filter by means of a physical model using physical values measured;

determination means (4, 6) which can determine a field of admissibility on the basis of the said first quantity of particulate ($x_{MS}$);

limiter means (5, 7) which can compare the said estimated value ($x_M$) with the said second quantity of particulate ($x_{MF}$), if the said second quantity of particulate ($x_{MF}$) is within the said field of admissibility, and can limit the said estimated value when the said second quantity of particulate ($x_{MF}$) is outside the said field of admissibility.

11. System according to claim 10, wherein the said determination means (4, 6) comprise a first multiplier (4) which can multiply the said first quantity of particulate ($x_{MS}$) by a first coefficient ($\alpha_{min}$), and can provide a lower limit value ($x_{MSmin}$); and a second multiplier (6) which can multiply the said first quantity of particulate ($x_{MS}$) by a second coefficient ($\alpha_{max}$), which is greater than the said first coefficient ($\alpha_{min}$), and can provide an upper limit value ($x_{MSmax}$).

12. System according to claim 11, wherein the said limiter means (5, 7) comprise a maximum calculation unit (5) which receives the said second quantity of particulate ($x_{MF}$) and the said lower limit value ($x_{MSmin}$) and provides a limited value ($x_1$), and a minimum calculation unit (7), which receives the said limited value ($x_1$) and the said upper limit value ($x_{MSmax}$) and provides the said estimated value ($x_M$).

* * * * *